United States Patent
Lee et al.

(10) Patent No.: US 11,400,916 B2
(45) Date of Patent: Aug. 2, 2022

(54) MILD HYBRID VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Tae Suk Lee, Yongin-si (KR); Young Ho Jung, Seoul (KR); Jung Hwan Bang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/093,088

(22) Filed: Nov. 9, 2020

(65) Prior Publication Data
US 2022/0009477 A1  Jan. 13, 2022

(30) Foreign Application Priority Data

Jul. 13, 2020  (KR) ........................ 10-2020-0086376

(51) Int. Cl.
*B60W 10/08*  (2006.01)
*B60W 20/14*  (2016.01)
(Continued)

(52) U.S. Cl.
CPC ............ *B60W 20/14* (2016.01); *B60W 10/06* (2013.01); *B60W 10/08* (2013.01); *B60W 30/188* (2013.01); *B60W 30/19* (2013.01); *B60W 2510/0208* (2013.01); *B60W 2510/0638* (2013.01); *B60W 2510/10* (2013.01); *B60W 2540/10* (2013.01); *B60W 2540/12* (2013.01); *B60W 2540/14* (2013.01); *B60W 2540/16* (2013.01)

(58) Field of Classification Search
CPC ............... B60W 20/14; B60W 30/188; B60W 2510/0208; B60W 2510/10; B60W 2510/0638; B60W 10/02; B60W 10/06; B60W 10/08; B60W 30/19; B60W 2540/10; B60W 2540/14; B60W 2540/12; B60W 2540/16
See application file for complete search history.

(56) References Cited

U.S. PATENT DOCUMENTS

2012/0150371 A1* 6/2012 Swales ................. B60W 10/08
701/22
2013/0316873 A1* 11/2013 Jansen .................. B60W 10/06
477/111

(Continued)

FOREIGN PATENT DOCUMENTS

CN  104828092 A  *  8/2015
GB  2444941 A  *  6/2008  ......... F02D 41/0215

*Primary Examiner* — Roger L Pang
(74) *Attorney, Agent, or Firm* — Morgan, Lewis & Bockius LLP (57) ABSTRACT

A mild hybrid vehicle and a method of controlling the same are provided. The mild hybrid vehicle includes a sensor that detects shift intention of a driver to provide the shift intention as sensing information, a controller that determines a target rotation speed of an MHSG based on the sensing information and controls the MHSG based on the target rotation speed, and the MHSG that controls the rotation speed of the engine under control of the controller when the shift intention is detected.

9 Claims, 8 Drawing Sheets

(51) Int. Cl.
*B60W 30/188* (2012.01)
*B60W 10/06* (2006.01)
*B60W 30/19* (2012.01)

(56) References Cited

U.S. PATENT DOCUMENTS

2017/0074188 A1* 3/2017 Kim .................... F02D 41/0225
2020/0148191 A1* 5/2020 Rawsky ................ B60W 10/06

* cited by examiner

MILD HYBRID VEHICLE AND METHOD OF CONTROLLING THE SAME

CROSS-REFERENCE TO RELATED APPLICATION

The present application claims the priority and the benefit of Korean Patent Application No. 10-2020-0086376, filed on Jul. 13, 2020, the entire contents of which are incorporated herein by reference.

TECHNICAL FIELD

The present disclosure relates to an apparatus and a method for controlling a mild hybrid starter & generator (MHSG) used in a mild hybrid vehicle.

BACKGROUND

A hybrid vehicle is a vehicle that efficiently uses the power of an internal combustion engine and a motor.

A hybrid vehicle may be divided into a mild type and a hard type according to the power sharing ratio of the internal combustion engine (engine) and the motor. A mild type hybrid vehicle (hereinafter, referred to as a mild hybrid vehicle) is provided with a mild hybrid starter & generator (MHSG) that starts an engine instead of an alternator or generates power by an engine output.

The mild hybrid vehicle may assist the engine torque according to the driving state by using the MHSG, and may charge the battery through regenerative braking.

SUMMARY

One aspect of the present disclosure is to provide a mild hybrid vehicle and a method of controlling a mild hybrid vehicle capable of maintaining an engine rotation speed (rpm) at a specific level or above by using the power of an MHSG.

Another aspect of the present disclosure is to provide a mild hybrid vehicle and a method of controlling a mild hybrid vehicle capable of reducing a speed difference between a driving shaft of an engine and a driven shaft of a transmission at a time when the driving shaft and the driven shafts are coupled to each other.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a mild hybrid vehicle includes a sensor that detects shift intention of a driver to provide the shift intention as sensing information, a controller that determines a target rotation speed of an MHSG based on the sensing information and controls the MHSG based on the target rotation speed, and the MHSG that controls the rotation speed of the engine under control of the controller in a state in which the shift intention is detected.

According to an aspect of the present disclosure, a method of controlling a mild hybrid vehicle includes a drive system separation prediction operation of detecting a clutch pedal operation by a driver or a clutch operation, a drive system separation check operation of separating an engine and a transmission corresponding to the clutch pedal operation, a drive system separation maintenance operation of unengaging a gear of the transmission in a state in which the engine and the transmission are separated, a drive system recombination prediction operation of engaging the gear of the transmission with a gear different from or equal to a previous gear in a state in which the engine and the transmission are separated, and a drive system recombination operation of recoupling the engine and the transmission separated, wherein the drive system separation prediction operation includes reducing an amount of regenerative power generation of an MHSG, and wherein each of the drive system separation check operation, the drive system separation maintenance operation and the drive system recombination prediction operation includes controlling a rotation speed of the MHSG to allow the engine to reach a target rotation speed.

DRAWINGS

In order that the disclosure may be well understood, there will now be described various forms thereof, given by way of example, reference being made to the accompanying drawings, in which.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

Figure 1:
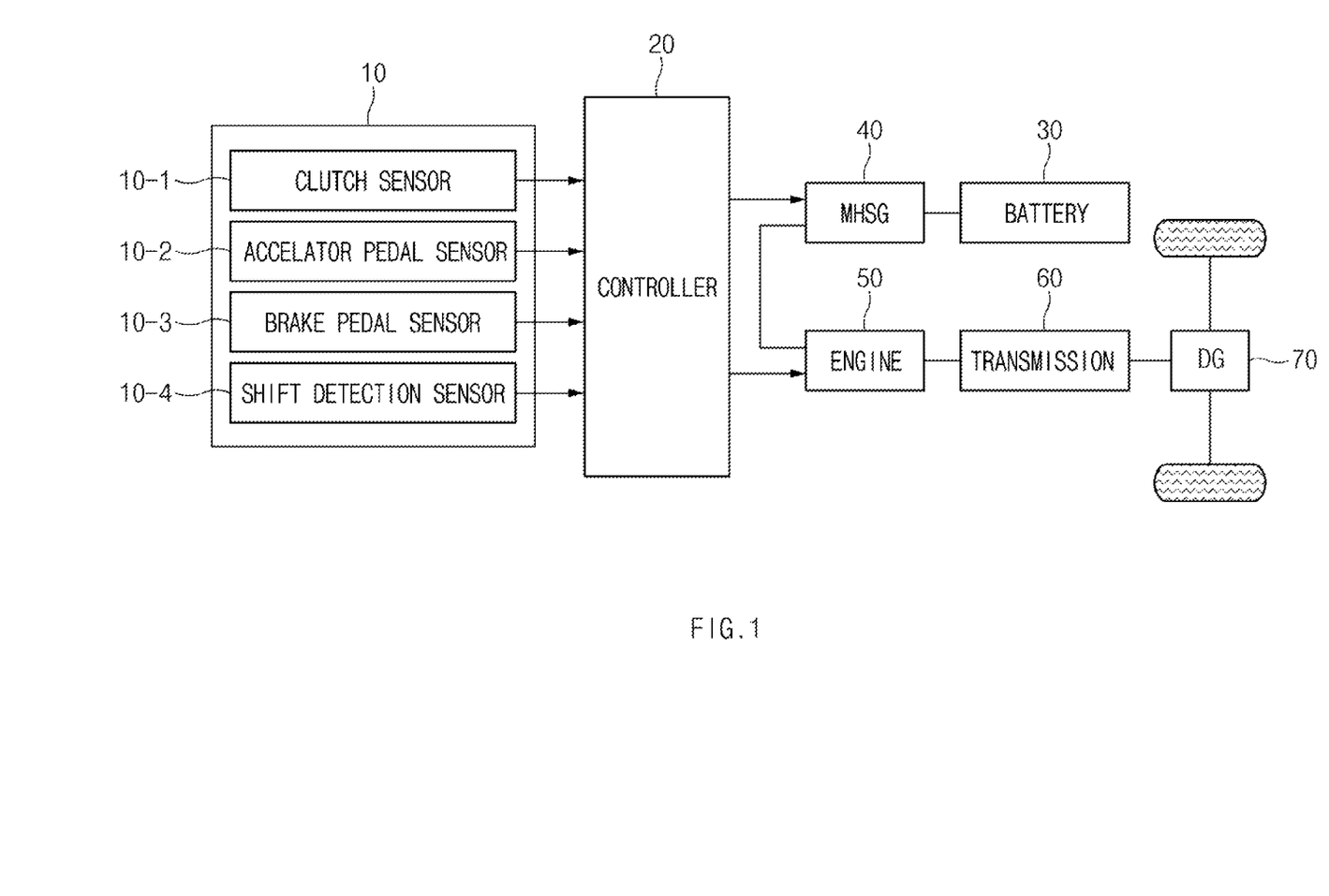
FIG. 1 is a view illustrating the configuration of a mild hybrid vehicle in one form of the present disclosure.

FIG. 1 is a view illustrating the configuration of a mild hybrid vehicle in some forms of the present disclosure.

Referring to FIG. 1, a controller 20 of a mild hybrid vehicle according to an embodiment of the present disclosure may be implemented in a vehicle. In this case, the controller 20 may be formed integrally with internal controllers of the vehicle, or may be implemented as a separate device and connected to control units of the vehicle through separate connection units.

As shown in FIG. 1, the mild hybrid vehicle according to an embodiment of the present disclosure may include a sensor 10, the controller 20, a battery 30, a mild hybrid starter & generator (MHSG) 40, an engine 50, a transmission 60, a differential gear apparatus 70, and a wheel 80.

The sensor 10 may transmit sensing information for controlling the MHSG 40 and the engine 50 to the controller 20. In this case, the sensing information may include information about sensed operation states of a clutch pedal, an accelerator pedal, and a brake pedal, and information about sensed a gear shift state of the transmission 60, and the like.

The sensor 10 may include a clutch sensor 10-1, an accelerator pedal sensor 10-2, a brake pedal sensor 10-3, and a shift detection sensor 10-4.

The clutch sensor 10-1 may detect a depression amount of a clutch pedal or an operation state of a clutch.

The accelerator pedal sensor 10-2 may detect an operation state of an accelerator pedal.

The brake pedal sensor 10-3 may detect an operation state of a brake pedal.

The shift detection sensor 10-4 may detect a gear shifting state of the transmission 60 or an operation state of a shifting actuator.

The controller 20 may control the MHSG 40 and the engine 50 based on the sensing information detected by the sensor 10.

For example, the controller 20 may control an output of the MHSG 40 or the engine 50 based on the sensing information detected by the sensor 10.

In more detail, the controller 20 may increase or decrease the output of the MHSG 40 or the engine 50 based on the information about the operation state of the accelerator pedal detected.

In the mild hybrid vehicle according to an embodiment of the present disclosure, when the vehicle speed is decelerated by driving resistance in a state in which the driver has no intention of accelerating (e.g., accelerator pedal opening=0), that is, the drive system is separated so that the output of the engine is not transferred to the transmission, the MHSG 40 may maintain the output of the engine 50, that is, the rotation speed (rpm) at a specific value or above. In this case, the time for which fuel is injected to the engine 50 may be reduced and the time for which the fuel is not injected may increase, thereby improving fuel efficiency.

In addition, in the mild hybrid vehicle according to an embodiment of the present disclosure, when the engine 50 and the transmission 60 are separated from each other so that the output of the engine 50 is not transmitted to the transmission 60 and the engine 50 and then, the output of the engine 50 is transferred to the transmission 60, that is, the engine 50 and the transmission 60 are recombined, the MHSG 40 may maintain the difference between the output of the engine 50, that is, the rotation speed (rpm) and the output (rpm) of the transmission 60 in a specified range, so that the recombination impact of the engine 50 and the transmission 60 is relieved.

The controller 20 provided in a mild hybrid vehicle according to an embodiment of the present disclosure may control the MHSG 40 based on the sensing information of the sensor 10, thereby improving the fuel efficiency of the mild hybrid vehicle and relieving the recombination impact of the engine and the transmission.

The battery 30 may supply power to the MHSG 40 or may be charged through the power recovered through the MHSG 40. In this case, the battery 30 is a high voltage battery (for example, a 48V battery) and may include a lithium-ion battery.

The MHSG 40 may convert electrical energy into mechanical energy or convert mechanical energy into electrical energy.

For example, the MHSG 40 may start the engine 50 based on a control signal provided from the controller 20 or generate power by the output of the engine 50. In addition, the MHSG 40 may assist the torque of the engine 50 based on a control signal provided from the controller 20.

In this case, the MHSG 40 may be implemented as a belt-type MHSG in which the crankshaft or camshaft of the engine 50 is connected through a belt.

The engine 50 may generate a driving force of a vehicle by burning a mixture of fuel and air to convert chemical energy into mechanical energy.

The engine 50 may generate an engine output, that is, torque, by controlling ignition timing, an air amount, a fuel amount, an air-fuel ratio, and the like based on a control signal provided from the controller 20.

The transmission 60 may receive the torque output from the engine 50 and transmit it to the differential gear 70. In this case, the transmission 60 may transfer the torque output from the engine 50 to the differential gear 70 when the output shaft of the engine 50 is coupled with the input shaft of the transmission 60. Meanwhile, the transmission 60 may separate the output shaft of the engine 50 from the input shaft of the transmission 60.

When the transmission 60 is manual, it may be coupled to or separated from the engine by a clutch. When the transmission 60 is manual and the engine and the transmission 60 are separated from each other by a clutch, the driver may moves the gear lever to a desired gear level to perform gear shifting.

When the transmission 60 is coupled with the engine 50, it may be called a close state of a drive system that the power (e.g., torque) generated from the engine 50 is transmitted to the wheel 80 through the differential gear 70.

Meanwhile, when the transmission 60 is separated from the engine 50, the case where the power generated from the engine 50 is not transmitted to the wheel 80 may be referred to as an open state of the drive system.

The differential gear 70 may transmit the torque output from the output shaft of the transmission 60 to the axle.

The wheel 80 may rotate by a rotational force transmitted from the axle.

Accordingly, the torque of the engine 50 may be transmitted to the input shaft of the transmission 60 by the clutch, the torque output from the output shaft of the transmission 60 may be transmitted to the axle via the differential gear 70, and the axle may rotate the wheel 80, so that the vehicle travels by the torque of the engine 50.

Meanwhile, when fuel is not injected into the engine 50, the wheel of the vehicle rotates due to gravity, and the rotation of the wheel may rotate the output shaft of the transmission 60 via the differential gear, and the engine 50 may be rotated by the rotational force transmitted through the clutch to the input shaft of the transmission 600. In this case, because the rotation speed (rpm) of the engine 50 is rapidly decreased when the drive system is separated, the mild hybrid vehicle according to an embodiment of the present disclosure may prevent the rotation speed of the engine 50 from being rapidly decreased and maintain the rotation speed of the engine 50 at a specified level.

In the mild hybrid vehicle according to an embodiment of the present disclosure configured as described above, when the vehicle speed is decelerated by the driving resistance in a state in which the driver has no intention of accelerating (e.g., accelerator pedal opening=0), that is, the drive system is separated so that the output of the engine 50 is not transferred to the transmission, the MHSG 40 may maintain the output of the engine 50, that is, the rotation speed (rpm) at a specific value or above. In this case, the time for which fuel is injected to the engine 50 may be reduced and the time for which the fuel is not injected may increase, thereby improving fuel efficiency.

In addition, in the mild hybrid vehicle according to an embodiment of the present disclosure, the engine 50 and the transmission 60 are separated from each other so that the output of the engine 50 is not transmitted to the transmission 60 and the engine 50 and then, the output of the engine 50 is transferred to the transmission 60, that is, the engine 50 and the transmission 60 are recombined, the MHSG 40 may maintain the output of the engine 50, that is, the rotation speed (rpm) at a specified value or above, so that the recombination impact of the engine 50 and the transmission 60 is relieved.

Accordingly, the mild hybrid vehicle according to the embodiment of the present disclosure may be a technology for controlling the MHSG 40 such that the rotation speed (rpm) of the engine 50 is maintained at a specified value or above in a state in which the drive system is separated.

In addition, in the mild hybrid vehicle according to an embodiment of the present disclosure, when the drive system is separated and then recombined, the MHSG 40 may maintain the rotation speed of the engine 50 at a specific value or above, so that the recombination impact of the drive system is relieved.

Figure 2:
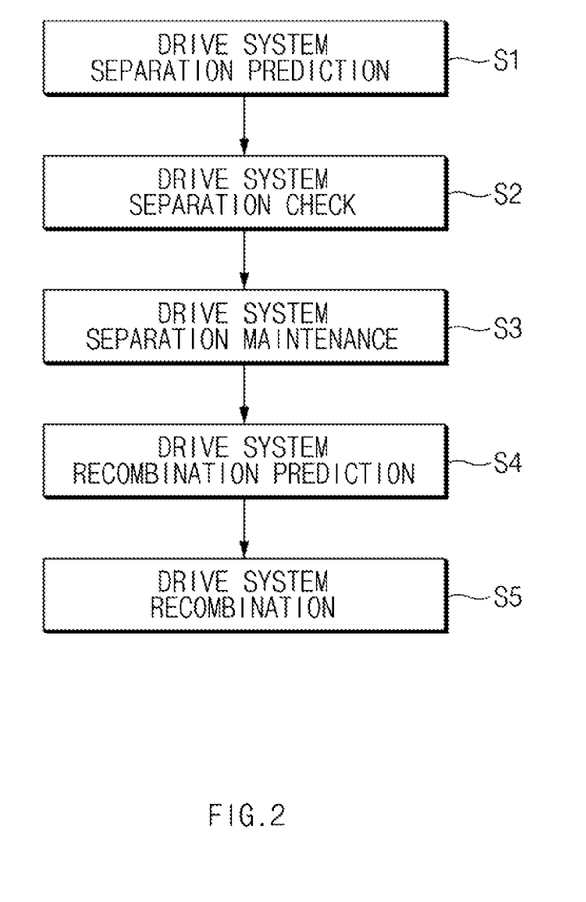
FIG. 2 is a view illustrating a method of controlling a mild hybrid starter & generator (MHSG) provided in a mild hybrid vehicle in one form of the present disclosure.

FIG. 2 is a view illustrating a method of controlling a mild hybrid starter & generator (MHSG) provided in a mild hybrid vehicle in some forms of the present disclosure.

Referring to FIG. 2 in more detail, FIG. 2 illustrates an operation in which the MHSG 40 is controlled by the controller 20 when the drive system of the mild hybrid vehicle according to an embodiment of the present disclosure is separated and then recombined.

As illustrated in FIG. 2, a method of controlling the MHSG 40 according to an embodiment of the present disclosure may include a drive system separation prediction operation S1, a drive system separation check operation S2, a drive system separation maintenance operation S3, a drive system recombination prediction operation S4, and a drive system recombination operation S5.

The drive system separation prediction operation S1 may include an operation in which a clutch pedal operation by a driver is detected by the clutch sensor 10-1.

In more detail, the drive system separation prediction operation S1 may mean a situation in which the driver has started to operate the clutch pedal, but the drive system is not actually separated.

Meanwhile, in a vehicle including an automatic transmission without a clutch pedal, the drive system separation prediction operation S1 may mean a case in which a difference occurs between a target gear ratio and a current gear ratio.

The drive system separation check operation S2 may include an operation in which the engine 50 and the transmission 60 are separated from each other by a clutch, and in the drive system separation check operation S2, the output of the engine 50 may not be transferred to the wheel 80.

In this case, the drive system separation check operation S2 may be a shift process by a driver or a process of preparing to stop. In addition, in the drive system separation check operation S2, because the inertia energy of the vehicle is not transferred to the engine 50 through the transmission 60, when the vehicle is in the state in which the fuel is not injected into the engine 50, the output of the engine 50, that is, rotation speed (rpm) may be rapidly decreased.

Figure 3:
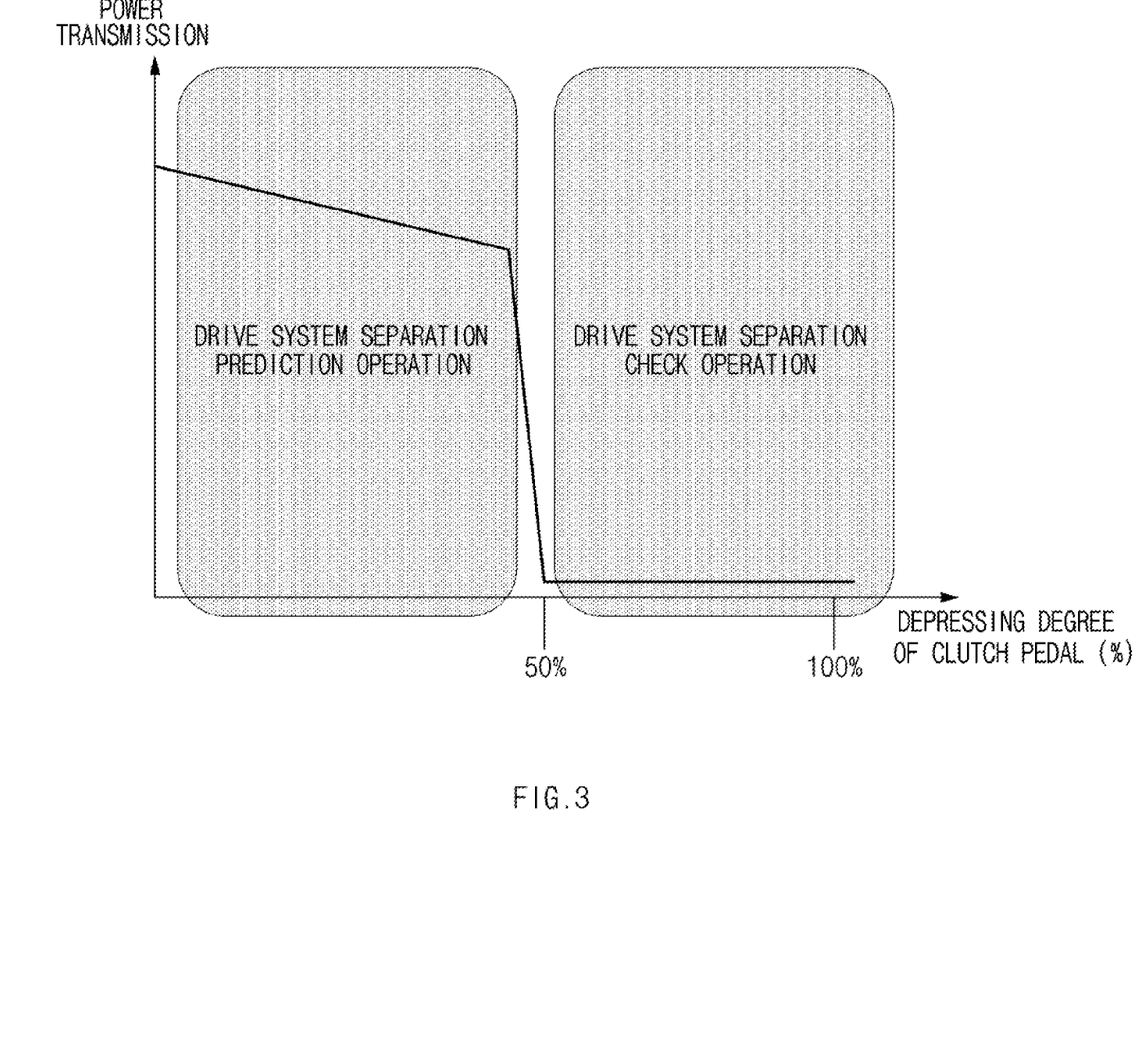
FIGS. 3 through 5 are views illustrating a method of controlling a mild hybrid starter & generator (MHSG) provided in a mild hybrid vehicle in one form of the present disclosure.

FIG. 3 is a view illustrating a process of dividing the drive system separation prediction operation S1 and the drive system separation check operation S2 based on a depressing degree of a clutch pedal by a driver.

For example, the clutch sensor 10-1 may detect the depressing degree of the clutch pedal by the driver, and the controller 20 may receive the detection result, that is, the sensing information of the clutch sensor 10-1.

In this case, the controller 20 may distinguish between the drive system separation prediction operation S1 and the drive system separation check operation S2 based on the sensing information provided from the clutch sensor 10-1.

In more detail, the controller 20 may perform the drive system separation prediction operation S1 when it is determined that the depressing degree of the clutch pedal is less than 50% based on the sensing information provided from the clutch sensor 10-1.

In addition, the controller 20 may perform the drive system separation check operation S2 when it is determined that the depressing degree of the clutch pedal is 50% or more based on the sensing information provided from the clutch sensor 10-1.

The drive system separation maintenance operation S3 of FIG. 2 may mean a state in which the gears of the transmission 60 are not engaged in a state in which the engine 50 and the transmission 60 are separated from each other by the clutch, and the drive system recombination prediction operation S4 may mean a state in which the transmission 60 is engaged with a gear different from or the same as a previous gear in a state in which the engine 50 and the transmission 60 are separated from each other by the clutch.

The controller 20 may distinguish between the drive system separation maintenance operation S3 and the drive system recombination prediction operation S4 based on the sensing information provided from the clutch sensor 10-1 and the shift detection sensor 10-4.

In a state that the controller 20 determines that the engine 50 and the transmission 60 are separated from each other based on the sensing information provided from the clutch sensor 10-1, when it is determined that the gears of the transmission 60 are not engaged (gear N-stage) based on the sensing information provided from the shift detection sensor 10-4, the controller 20 may perform the drive system separation maintenance operation S3.

In this case, in the drive system separation maintenance operation S3, because the engine 50 and the transmission 60 are separated from each other so that the gears of the transmission 60 are not engaged, the driving force cannot be transmitted to the wheel 80 in the same manner as the drive system separation check operation S2, and in terms of the driver, it may be a process of shifting or preparing to stop. In addition, because the inertial energy of the vehicle is not transferred to the engine 50 through the transmission 60 in the drive system separation maintenance operation S3, when fuel is not injected into the engine 50, the output of the engine 50, that is, the rotation speed (rpm) may be rapidly decreased.

In addition, in a state that it is determined that the engine 50 and the transmission 60 are separated from each other based on the sensing information provided from the clutch sensor 10-1, when it is determined that the transmission 60 is engaged with a gear different from or the same as a previous gear based on the sensing information provided from the shift detection sensor 10-1, the controller 20 may perform the drive system recombination prediction operation S4.

In the drive system recombination prediction operation S4 which is an operation of clearly identifying the shift intention of a driver, it is possible to predict the accelerating or decelerating intention of a driver through the difference in the previous gear ratio.

The drive system recombination operation S5 may be determined as an operation in which the engine 50 and the transmission 60 may be coupled to each other by the clutch and the gear of the transmission 60 may be engaged. In this case, the drive system recombination operation S5 may be defined as an operation of reducing the depressing degree of the clutch pedal by a driver, that is, until immediately before the clutch is actually recombined after starting to take off the clutch pedal.

When a section in which the depressing degree of the clutch pedal starts to decrease from 100% to 50% is detected based on the sensing information provided from the clutch sensor 10-1, the controller 20 may perform the drive system recombination operation S5.

Accordingly, based on the sensing information provided from the clutch sensor 10-1 and the shift detection sensor 10-4, the controller 20 may distinguish between the drive system separation prediction operation S1, the drive system separation check operation S2, the drive system separation maintenance operation S3, the drive system recombination prediction operation S4, and the drive system recombination operation S5, and perform each operation.

The controller 20 may control the MHSG 40 for the purpose of improving fuel economy in the drive system separation prediction operation S1, the drive system separation check operation S2 and the drive system separation maintenance operation S3 among the drive system separation prediction operation S1, the drive system separation check operation S2, the drive system separation maintenance operation S3, the drive system recombination prediction operation S4, and the drive system recombination operation S5, and may control the MHSG 40 for the purpose of relieving the impact due to shifting and preventing abnormal vibration in the drive system separation maintenance operation S3, the drive system recombination prediction operation S4 and the drive system recombination operation S5.

In this case, the controller 20 may control the output of the MHSG 40 for the purpose of improving fuel economy, relieving the impact due to shifting, and preventing abnormal vibration, thereby maintaining the output of the engine 50, that is, the rotation speed (rpm) at a set value.

Figure 4:
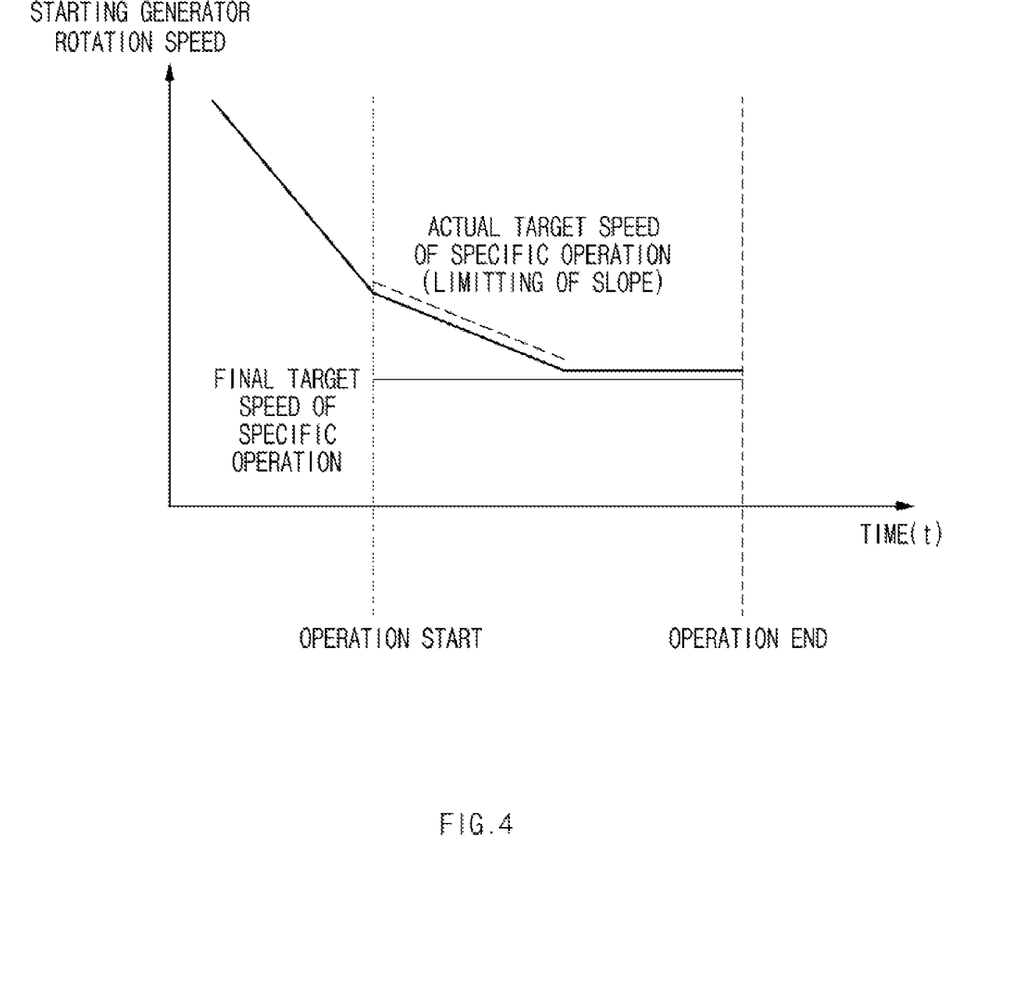

The controller 20 may limit (reduce) an output slope, as shown in FIG. 4, to prevent a rapid output change (e.g., a slope) before the output of the MHSG 40, that is, the rotation speed (rpm) reaches a set value required in each of the drive system separation prediction operation S1, the drive system separation check operation S2, the drive system separation maintenance operation S3, the drive system recombination prediction operation S4, and the drive system recombination operation S5.

In the drive system separation prediction operation S1 which is an operation in which the driver has no intention of accelerating, that is, the depressing degree of the accelerator pedal is not detected, and the depressing degree of the clutch pedal begins to be detected, the fuel may not be injected into the engine 50 and the output of the engine 50 may be rapidly decreased as soon as the engine 50 and the transmission 60 are separated from each other. Therefore, the drive system separation prediction operation S1 may reduce a regenerative power generation load (magnetic field) of the MHSG 40.

For example, based on the sensing information provided from the clutch sensor 10-1, the controller 20 may reduce magnetic field intensity of the MHSG 40 to reduce the regenerative generation amount of the MHSG 40 from a time point (the depressing degree of the clutch pedal of 1%) at which the depressing degree of the clutch pedal starts to be detected to a preset time point (the depressing degree of the clutch pedal of 50%).

The drive system separation check operation S2, which is performed in a state in which fuel is not injected to the engine 50 and the engine 50 and the transmission 60 are separated so that it is difficult to maintain the output of the engine 50, may be an operation in which the controller 20 starts to control the output (speed) of the MHSG 40 in order to maintain the output of the engine 50.

In general, when the output of the engine 50, that is, the rotation speed (rpm) is lowered below a specified rotation speed (rpm), because fuel is injected to the engine 50 to prevent the engine from being turned off, in the drive system separation check operation S2 according to an embodiment of the present disclosure, the output of the MHSG 40 may be controlled to allow the engine 50 to be maintained at a specified rotation speed (rpm) in order to prevent the engine 50 from being turned off in a state in which fuel is not injected to the engine 50 and the engine 50 and the transmission 60 are separated from each other so that the output of the engine 50 cannot be maintained.

Therefore, in the drive system separation check operation S2, the engine 50 may be prevented from being turned off and a time for which fuel is not injected to the engine 50 may increase, so that it is possible to improve fuel efficiency.

For example, when it is determined that the depressing degree of the clutch pedal exceeds 50% based on the sensing information provided from the clutch sensor 10-1, the controller 20 may control the output of the MHSG 40, that is, the rotation speed (rpm) to allow the engine 50 to be kept at a specified rotation speed (rpm).

In this case, the specific rotation speed of the engine 50 may be called F/Cut IN rpm, and the target rotation speed of the MHSG 40 controlled by the controller 20 may be defined as F/Cut IN rpm+GAP. The GAP may be a value set by the designer. The specific rotation speed F/Cut IN rpm of the engine 50 may be the minimum rotation speed at which the engine is not turned off even when fuel is not injected to an engine.

That is, in the drive system separation check operation S2, in order to maintain a specific rotation speed of the engine 50, the MHSG 40 may be controlled to output the specific rotation speed increased by a set value (GAP) other than a specified rotation speed (F/Cut IN rpm) of the engine 50.

In the drive system separation maintenance operation S3, in a state in which the engine 50 and the transmission 60 are separated from each other by the clutch and the gear of the transmission 60 is also not engaged (gear neutral, gear N-stage), a next operation (acceleration or deceleration) of a driver may be predicted based on the previous acceleration of the vehicle, the pedal operation situation of the driver, and the appropriate rotation speed (rpm) of the engine 50 based on the vehicle speed, and the rotation speed of the engine 50 may be predicted based on the predicted operation (a predicted engagement gear ratio). Then, the output of the MHSG 40 may be controlled to allow the engine 50 to reach the predicted rotation speed.

In the drive system separation maintenance operation S3, it is possible to predict whether to accelerate or decelerate the vehicle based on the acceleration of the vehicle before the drive system separation prediction operation S1, that is, the occurrence of a shift evet, the depressing degree of the accelerator pedal, and a changing speed in the depressing degree of the clutch pedal (Sharpness→Gear stage is likely to be down, Gentle→Gear stage is likely to be up), and the history of brake pedal operation (whether the brake is currently pressed, a brake pedal depressing state before the occurrence of a shift event, and the like).

In addition, in the drive system separation maintenance operation S3, it is possible to predict a driving gear ratio of the transmission 60 corresponding to the predicted acceleration or deceleration of the vehicle based on the driving gear ratio suitable for a current vehicle speed and predict the rotation speed of the engine 50 corresponding to the predicted driving gear ratio.

In the drive system separation maintenance operation S3, it is possible to control the output of the MHSG 40 such that the engine 50 reaches the predicted rotation speed.

For example, the controller 20 may predict the acceleration or deceleration of the vehicle based on the sensing information sensed by the clutch sensor 10-1, the accelerator pedal sensor 10-2, the brake pedal sensor 10-3, and the shift detection sensor 10-4, predict the driving gear ratio of the transmission 60 corresponding to the predicted acceleration or deceleration of the vehicle, and control the output of the MHSG 40 to reach the rotation speed corresponding to the predicted driving gear ratio of the transmission 60.

Figure 5:
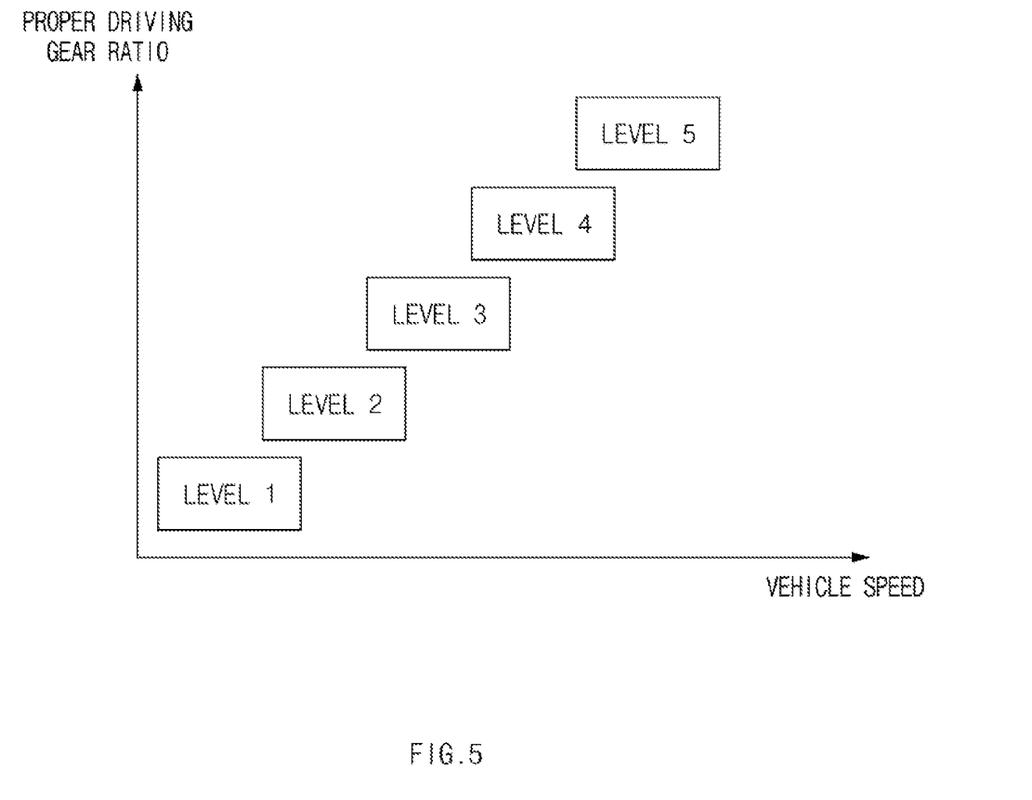

Referring to FIG. 5, as the vehicle speed increases, the driving gear ratio of the transmission 60 may increase. Therefore, in the drive system separation maintenance operation S3, the proper driving gear ratio of the transmission 60 may be predicted based on the vehicle speed corresponding to the vehicle acceleration/deceleration prediction and the predicted rotation speed of the engine 50 may be calculated based on to the predicted driving gear ratio. In addition, the drive system separation maintenance operation S3 may include an operation of controlling the MHSG 40 such that the engine 50 reaches the predicted rotational speed. In this case, the engine speed ratio (N/V ratio=engine rotation speed/vehicle speed) may be used to predict an expected rotation speed (rpm) of a specific gear, and the MHSG 40 may be controlled to allow the engine 50 to reach the predicted rotation speed. Because the ratio between the engine rotation speed and the vehicle speed has a specific constant value when the transmission 60 is connected to the engine 50, the engine speed may also be predictable when the vehicle speed and the engaging gear are predictable.

When it is impossible to predict the driving gear ratio of the transmission 60 by the driver in the drive system separation maintenance operation S3, as shown in FIG. 4, the MHSG 40 may be controlled to limit the decreasing slope of the rotation speed of the engine 50 so that the rotation speed of the engine 50 is slowly reduced.

In addition, when it is possible to predict the driving gear ratio of the transmission 60 by the driver at a high probability in the drive system separation maintenance operation S3, as described above, the predicted rotation speed of the engine 50 may be calculated, and the MHSG 40 may be controlled to allow the rotation speed of the engine 50 to reach the predicted rotation speed. Meanwhile, when it is impossible to predict the driving gear ratio of the transmission 60 by the driver at a high probability in the drive system separation maintenance operation S3, the MHSG 40 may be controlled to reach the rotational speed of the engine 50 corresponding to a ratio set in a range of an idle speed (rpm) to the predicted engine rotation speed.

The drive system recombination prediction operation S4 may be a state in which the rotation speed of the engine 50 must finally reach the engine rotation speed predicted in the drive system separation maintenance operation S3 in a state where the gears of the transmission 60 are engaged by the driver's operation while the engine 50 and the transmission 60 are separated from each other by the clutch.

The drive system recombination operation S5, which is an operation in which the depressing degree of the clutch pedal by the driver becomes 0% so that the engine 50 and the transmission 60 are connected to each other, may be a time point at which the control (speed control) of the MHSG 40 according to an embodiment of the present disclosure is terminated.

In this case, when the rotation speed of the engine 50 reaches the predicted engine rotation speed in the drive system recombination prediction operation S4, the impact that may occur in the drive system recombination (connecting the engine and the transmission) in the drive system recombination operation S5 may be reduced, and abnormal vibration may be relieved. When the speed control of the MHSG 40 is terminated in the drive system recombination operation S5, the MHSG 40 may enter a torque control mode or may remain uncontrolled.

The method of controlling the MHSG 40 of a mild hybrid vehicle according to an embodiment of the present disclosure, which includes the drive system separation prediction operation S1, the drive system separation check operation S2, the drive system separation maintenance operation S3, the drive system recombination prediction operation S4, and the drive system recombination operation S5, may be performed in a state in which the engine 50 and the transmission 60 are separated from each other by the clutch. Therefore, when a depressing degree of the accelerator pedal is detected or a depressing degree of or the clutch pedal is not detected in one of the drive system separation prediction operation S1, the drive system separation check operation S2, the drive system separation maintenance operation S3, the drive system recombination prediction operation S4, and the drive system recombination operation S5, that is, a situation in which the engine 50 and the transmission 60 are coupled again occurs, the method of controlling the MHSG 40 (speed control) according to the present disclosure may be terminated.

The operation of the MHSG 40 included in a mild hybrid vehicle according to an embodiment of the present disclosure will be described below with reference to FIG. 7.

Figure 6:
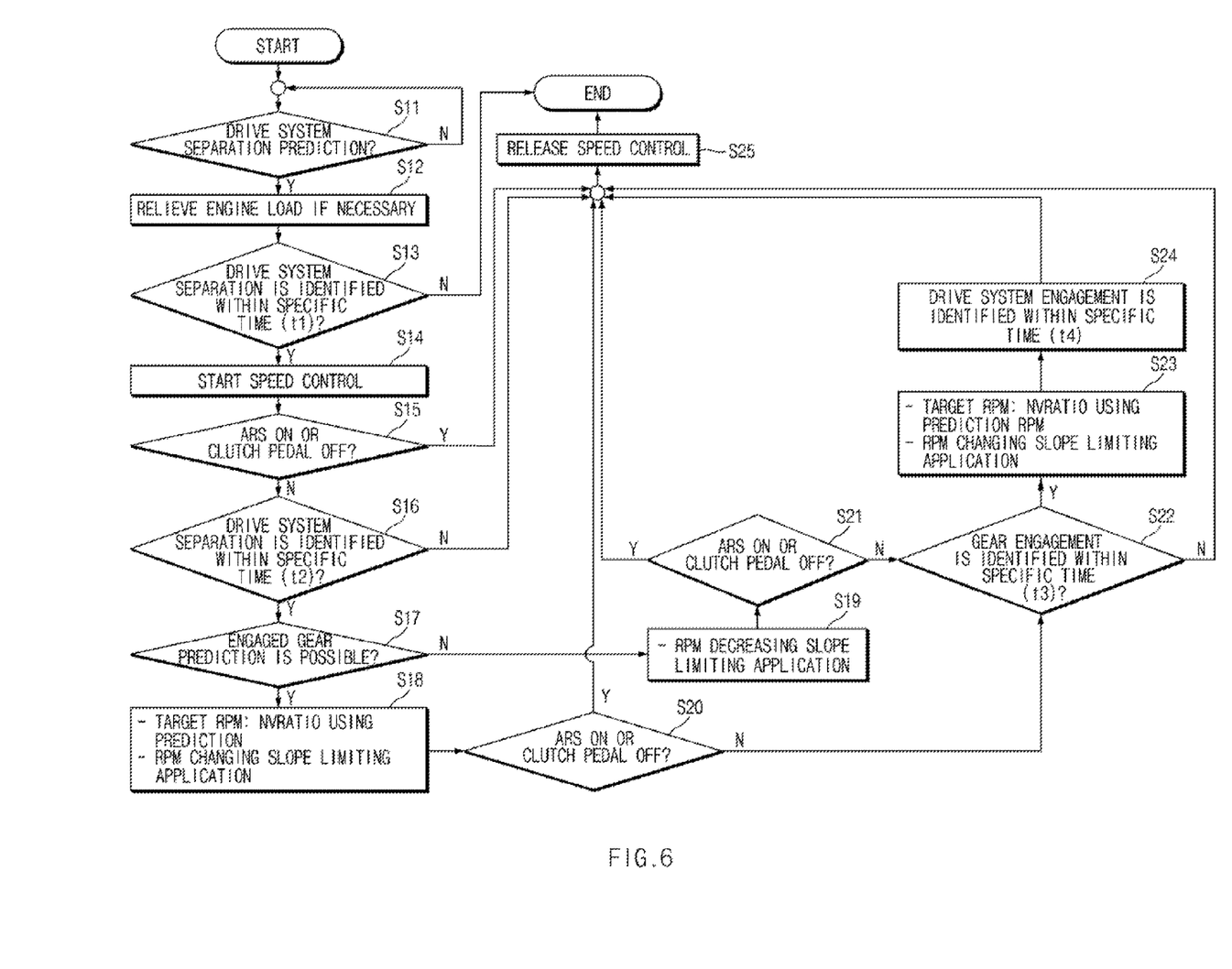
FIG. 6 is a flowchart illustrating a method of controlling a mild hybrid starter & generator (MHSG) provided in a mild hybrid vehicle in one form of the present disclosure.

In S11, separation of the drive system may be predicted based on whether the clutch pedal is depressed by the driver.

In S12, when the separation of the drive system (the decoupling of the engine and the transmission) is predicted (Y), the load on the engine 50 may be reduced by reducing the magnetic field intensity of the MHSG 40. In this case, it may be predicted that the drive system will be separated when the depressing degree of the clutch pedal begins to be detected.

Meanwhile, when the separation of the drive system is not predicted (N), the operation for predicting the separation of the drive system may be continuously performed.

In S13, when the depressing degree of the clutch pedal is detected by 50% or more, it may be identified that the drive system is separated by the clutch.

When a specific time t1, (the time until the drive system separation is identified after the drive system separation is predicted) elapses while the depressing degree of the clutch pedal is less than 50% (N), the method of controlling the MHSG of a mild hybrid vehicle according to an embodiment of the present disclosure may be terminated.

Meanwhile, in S14, when the depressing degree of the clutch pedal exceeds 50% so that it is identified that the drive system separation is identified (Y), the speed control (start of speed control) of the MHSG of a mild hybrid vehicle according to an embodiment of the present disclosure may be started.

In this case, the target rotation speed (F/Cut IN RPM) of the engine 50 may be predicted, and the output of the MHSG 40 may be controlled to reach the rotation speed increased by the rotation speed (CAP) set to the target rotation speed of the engine 50 (F/Cut IN RPM+CAP). In addition, in order to prevent the actual rotation speed of the engine 50 from decreasing rapidly, the MHSG 40 may be controlled to allow the decreasing slope of the rotation speed of the engine 50 may be smooth.

After the speed control of the MHSG 40 starts in S14, the speed control of the MHSG 40 may be terminated corresponding to the operation of the accelerator pedal and the clutch pedal by the driver, or it may be possible to perform a next operation of the speed control of the MHSG 40 in S15.

For example, after the speed control of the MHSG 40 is started in S14, when the depressing degree of the accelerator pedal is detected (ARS ON) or the depressing degree of the clutch pedal is not detected (clutch pedal OFF) (Y), the speed control of the MHSG 40 may be terminated in S25.

Meanwhile, after the speed control of the MHSG 40 is started in S14, the depressing degree of the accelerator pedal is not detected (ARS OFF) or the depressing degree of the clutch pedal increases (the clutch pedal is ON) (N), it may be determined in S16 whether the transmission gears are engaged.

For example, even when a specific time t2 elapses in S16 of determine whether the transmission gears are engaged (N), the speed control of the MHSG 40 may be terminated in S25 when the transmission gear remains engaged (N).

Meanwhile, when the transmission gears are not engaged within the specific time t2 in S16 of determining whether the transmission gears are engaged (Y), it is possible to predict the next operation of the driver to predict the engaged gears of the transmission in S17.

When it is possible to predict the engaged gears of the transmission at a high probability (Y), in S18, the target rotation speed (rpm) of the engine 50 may be predicted by using the ratio (N/V ratio) between the engine rotation speed and the vehicle speed, and it is possible to allow the output of the MHSG 40 to reach the rotation speed (F/Cut IN RPM+CAP) increased by the rotation speed (CAP) set to the target rotation speed of the engine 50.

In addition, when it is possible to predict the engaged gears of the transmission at a low probability (N), in S18, the target rotation speed (rpm) of the engine 50 may be predicted by using the ratio (N/V ratio) between the engine rotation speed and the vehicle speed, and the MHSG 40 may be controlled to allow the engine 50 to have an output (rotation speed) between the target rotation speed and the idle speed (rpm).

In this case, by controlling the output of the MHSG 40 in order to prevent the rotation speed of the engine 50 from being rapidly decreased, an operation of reducing the decreasing slope (change amount) of the rotation speed of the engine 50 may be preceded (see FIG. 4).

Meanwhile, when the gear engagement of the transmission is not predicted, in S19, by controlling the output of the MHSG 40 in order to prevent the rotation speed of the engine 50 from being rapidly decreased, an operation of reducing the decreasing slope of the rotation speed of the engine 50 may be performed (see FIG. 4).

Even when the gear engagement of the transmission 60 is predicted and the MHSG 40 is controlled to allow the engine 50 to reach the target rotation speed in S18, in S20, the speed control of the MHSG 40 may be terminated corresponding to the operations of the accelerator pedal and clutch pedal by the driver, or the next operation of the speed control of the MHSG 40 may be performed.

For example, in the case where gear engagement of the transmission 60 is predicted, when the depressing degree of the accelerator pedal is detected (ARS ON) or the depressing degree of the clutch pedal is not detected (clutch pedal OFF) (Y), even in S18 of controlling the MHSG 40 to allow the engine 50 to reach the target rotation speed, the speed control of the MHSG 40 may be terminated in S25.

Meanwhile, in the case where gear engagement of the transmission 60 is predicted, when the depressing degree of the accelerator pedal is not detected (ARS OFF) or the depressing degree of the clutch pedal increases (clutch pedal ON) (N), even in S18 of controlling the MHSG 40 to allow the engine 50 to reach the target rotation speed, it is possible to identify the gear engagement of the transmission in S22.

In addition, even when the gear engagement of the transmission 60 is not predicted so that S19 of decreasing the decreasing slope of the rotation speed of the engine 50 is performed, in S21, the speed control of the MHSG 40 may be terminated corresponding to the operations of the accelerator pedal and clutch pedal by the driver, or a next operation of the speed control of the MHSG 40 may be performed.

For example, when the gear engagement of the transmission 60 is not predicted so that S19 of decreasing the decreasing slope of the rotation speed of the engine 50 is performed and the depressing degree of the accelerator pedal is detected (ARS ON) or the depressing degree of the clutch pedal is not detected (clutch pedal OFF) (Y), the speed control of the MHSG 40 may be terminated in S25.

Meanwhile, when the gear engagement of the transmission 60 is not predicted so that S19 of decreasing the decreasing slope of the rotation speed of the engine 50 is performed and the depressing degree of the accelerator pedal is not detected (ARS OFF) or the depressing degree of the clutch pedal is increased (clutch pedal ON) (N), it is possible to identify the gear engagement of the transmission in S22.

In S22, the speed control of the MHSG 40 may be terminated or continued depending on whether the transmission gears are engaged.

For example, when the gear engagement of the transmission 60 is not identified within a specific time t3 (N), the speed control of the MHSG 40 may be terminated in S25.

Meanwhile, when the gear engagement of the transmission is identified within the specific time t3 (Y), the speed control of the MHSG 40 may be continuously performed to the rotation speed of the engine 50 to reach the target rotation speed in S23.

For example, when the gear engagement of the transmission is identified within the specific time t3 (Y), the speed control of the MHSG 40 performed in previous S18 and S19 may be continued.

In more detail, the MHSG 40 may be continuously controlled to allow the rotation speed of the engine 50 to reach the target rotation speed (rpm) of the engine 50 predicted by using the ratio (N/V ratio) between the engine rotation speed and the vehicle speed in S18, or may be continuously controlled to limit, in S19, the slope in order to prevent the rotation speed of the engine 50 from being rapidly decreased.

Thereafter, when the coupling of the drive system, that is, the coupling of the engine 50 and the transmission 60 is identified within a specific time t4 in S24, the speed control of the MHSG 40 may be terminated in S24.

In this case, the specific time t1 may be a time to limit a time elapsed until the drive system separation prediction start time, the specific time t2 may be a time elapsed after the drive system is separated by the clutch, the specific time t3 may be a time elapsed after the drive system is separated depending on whether the gears are engaged, and the specific time t4 may be a time elapsed after the gears are engaged, where all the times may be times corresponding to set values.

Hereinafter, a method of controlling a MHSG of a mild hybrid vehicle according to an embodiment of the present disclosure will be described with reference to FIGS. 7 and 8 which illustrate the rotation speed of an engine according to control of the MHSG of the mild hybrid vehicle.

Figure 7:
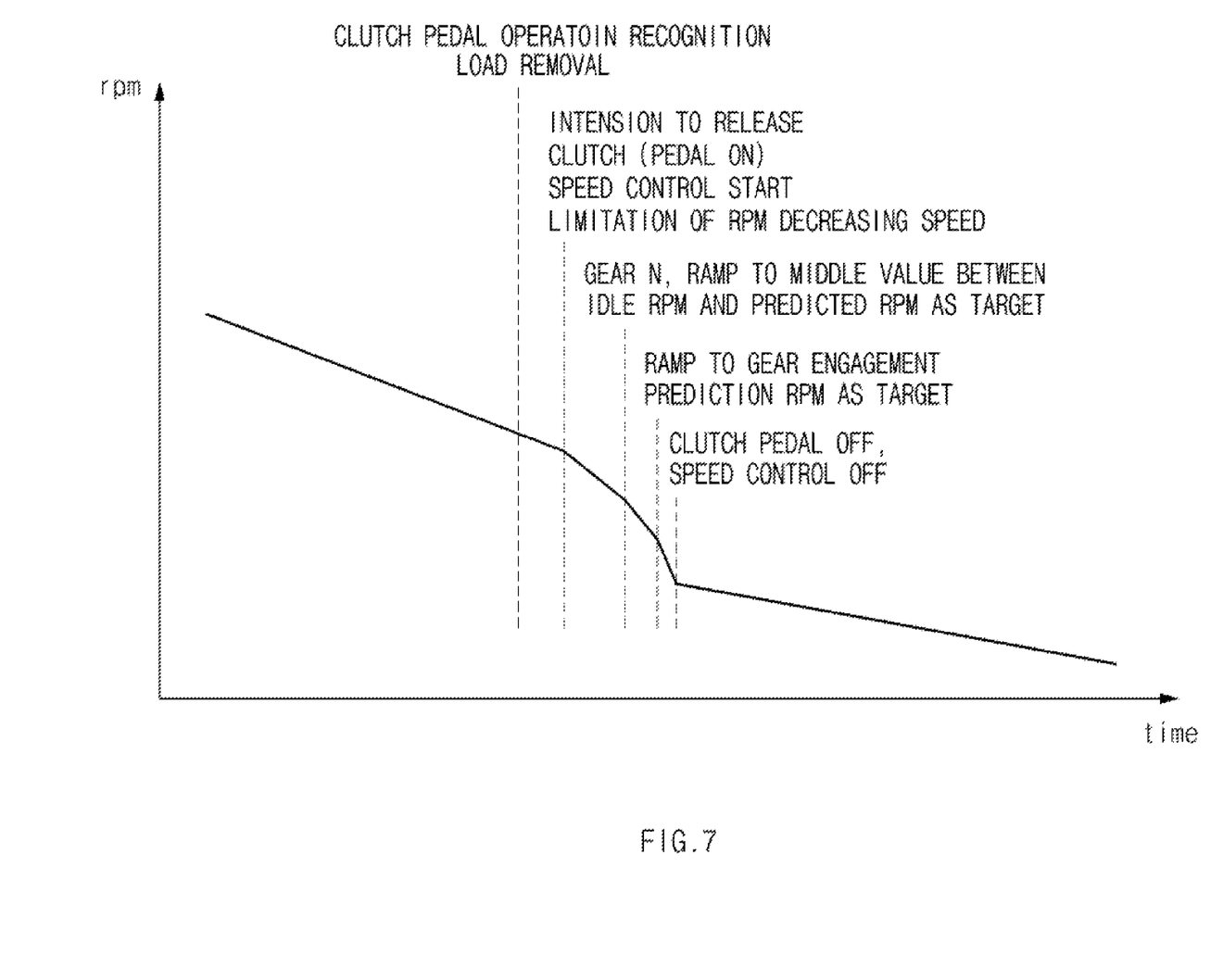
FIGS. 7 and 8 are graphs illustrating a method of controlling a mild hybrid starter & generator (MHSG) provided in a mild hybrid vehicle in one form of the present disclosure.

FIG. 7 is a view illustrating a case in which the transmission 50 is up-shifted to a higher gear ratio than a previous gear ratio as an example.

Referring to FIG. 7, when the operation of the clutch pedal by the driver is detected, the drive system separation prediction operation S1 may be performed. In this case, to reduce the load of the engine 50 caused by the regenerative power generation of the MHSG 40, the magnetic field intensity of the MHSG 40 may be reduced (recognition of clutch pedal operation, load removal).

The drive system separation check operation S2, in which the engine 50 and the transmission 60 are separated from each other by the clutch due to the operation of the clutch pedal by the driver, may be performed. In this case, the speed of the MHSG 40 may be controlled by the controller 20. Due to the speed control, the MHSG 40 may prevent the rotation speed of the engine 50 from being rapidly decreased (restriction of the rpm decreasing speed).

Thereafter, the drive system separation maintenance operation S3 (gear N stage) may be performed. In this case, in a method of controlling the MHSG 40 according to an embodiment of the present disclosure, when a next engaging gear by the driver is predicted at a low probability, the rotation speed of the engine 50 may be controlled to have a value between the target rotation speed (predicted rpm) and the idle rotation speed (rpm) (gear N, ramp to a middle value between the idle rpm and the predicted rpm as the target).

When the gear engagement is determined by the driver's gear shift operation, the drive system recombination prediction operation (S4) may be performed. In this case, in order for the engine 50 to reach the predicted target rotation speed by the engaged gear ratio, the MHSG 40 may be speed-controlled (gear engagement, ramp to the predicted rpm as the target).

When the clutch pedal operation by the driver is not detected (clutch pedal off), the speed control of the MHSG 40 may be released.

Figure 8:
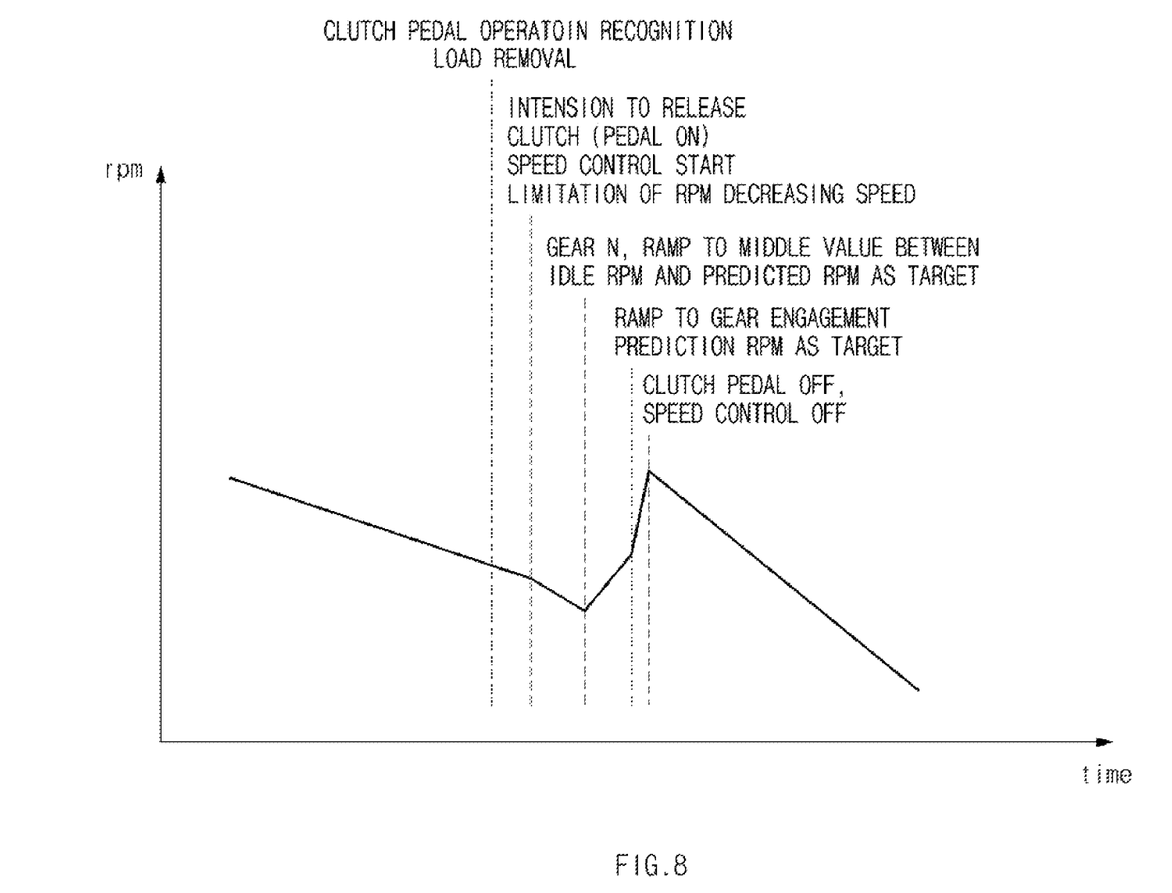

FIG. 8 is a view illustrating a case in which the transmission 60 is down-shifted to a lower gear ratio than a previous gear ratio as an example.

Referring to FIG. 8, when the operation of the clutch pedal by the driver is detected, the drive system separation prediction operation S1 may be performed. In this case, to reduce the load of the engine 50 caused by the regenerative power generation of the MHSG 40, the magnetic field intensity of the MHSG 40 may be reduced (recognition of clutch pedal operation, load removal).

The drive system separation check operation S2, in which the engine 50 and the transmission 60 are separated from each other by the clutch due to the operation of the clutch pedal by the driver, may be performed. In this case, the speed of the MHSG 40 may be controlled by the controller 20. Due to the speed control, the MHSG 40 may prevent the rotation speed of the engine 50 from being rapidly decreased (restriction of the rpm decreasing speed).

Thereafter, the drive system separation maintenance operation S3 (gear N stage) may be performed. In this case, in a method of controlling the MHSG 40 according to an embodiment of the present disclosure, when a next engaging gear by the driver is predicted at a low probability, the rotation speed of the engine 50 may be controlled to have a value between the target rotation speed (predicted rpm) and the idle rotation speed (rpm) (gear N, ramp to a middle value between the idle rpm and the predicted rpm as the target).

When the gear engagement is determined by the driver's gear shift operation, the drive system recombination prediction operation (S4) may be performed. In this case, in order for the engine 50 to reach the predicted target rotation speed by the engaged gear ratio, the MHSG 40 may be speed-controlled (gear engagement, ramp to the predicted rpm as the target).

When the clutch pedal operation by the driver is not detected (clutch pedal off), the speed control of the MHSG 40 may be released.

According to the present technology, the power of MHSG may be used to maintain the rotation speed (rpm) of an engine at a specific level or above, so that the fuel injection time of the engine is reduced or the fuel non-injection time is increased, thereby improving the fuel efficiency of a vehicle.

In addition, according to the present technology, the speed difference between the driving shaft of an engine and the driven shaft of a transmission may be reduced at a time when the driving shaft and the driven shaft are coupled to each other, so that the vehicle vibration due to impact generated when the driving shaft and the driven shaft are coupled to each other is reduced and the stability of vehicle control is improved.

In addition, various effects that are directly or indirectly understood through the present disclosure may be provided.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A mild hybrid vehicle comprising:
at least one sensor configured to detect shift intention of a driver to provide the shift intention as sensing information;
a controller configured to:
determine a target rotation speed of a mild hybrid starter and generator (MHSG) based on the sensing information; and
control the MHSG based on the target rotation speed; and
the MHSG configured to control a rotation speed of an engine when the shift intention is detected,
wherein the at least one sensor further comprises:
an accelerator pedal sensor configured to:
detect an operation state of an accelerator pedal; and
output the operation state of the accelerator pedal as the sensing information,
wherein the controller is further configured to:
control the rotation speed of the engine such that the rotation speed of the engine is not affected by a rotation speed of the MHSG when a depressing degree of the accelerator pedal is detected after the shift intention is detected.

2. The mild hybrid vehicle of claim 1, wherein the at least one sensor further comprises:
a clutch sensor configured to:
detect a depressing degree of a clutch pedal or an operation state of a clutch; and
output the depressing degree of the clutch pedal or the operation state of the clutch as the sensing information;
a brake pedal sensor configured to:
detect an operation state of a brake pedal; and
output the operation state of the brake pedal as the sensing information; and
a shift detection sensor configured to:
detect an operation state of a shift actuator or a gear shift state of a transmission; and
output the operation state of the shift actuator or the gear shift state of the transmission as the sensing information.

3. The mild hybrid vehicle of claim 2, wherein the controller is configured to:
determine the shift intention of the driver based on the depressing degree of the clutch pedal.

4. The mild hybrid vehicle of claim 3, wherein the controller is configured to:
decrease an amount of regenerative power of the MHSG when the shift intention is detected.

5. The mild hybrid vehicle of claim 3, wherein the controller is configured to:
control the rotation speed of the MHSG to decrease a changing slope of the rotation speed of the engine when the shift intention is detected.

6. The mild hybrid vehicle of claim 3, wherein the controller is configured to:
control the rotation speed of the MHSG to allow the engine to reach a predetermined rotation speed when the clutch separates the engine and the transmission by the clutch pedal.

7. The mild hybrid vehicle of claim 2, wherein the controller is configured to:
calculate a predicted rotation speed of the engine based on the sensing information outputted by the clutch sensor, the accelerator pedal sensor and the shift detection sensor; and
control the rotation speed of the MHSG to allow the engine to reach a predetermined rotation speed.

8. The mild hybrid vehicle of claim 7, wherein the controller is configured to:
predict acceleration and deceleration of a vehicle speed based on the clutch pedal, the accelerator pedal and the gear shift state when the depressing degree of the clutch pedal is detected;
calculate the predicted rotation speed of the engine based on a prediction result; and
control the rotation speed of the MHSG to allow the engine to reach the predicted rotation speed.

9. The mild hybrid vehicle of claim 7, wherein the controller is configured to:
predict acceleration and deceleration of a vehicle speed based on the clutch pedal, the accelerator pedal and the gear shift state when the depressing degree of the clutch pedal is detected;
calculate the predicted rotation speed of the engine based on a prediction result; and
control the rotation speed of the MHSG to reach a rotation speed between the predicted rotation speed and an idle rotation speed.

* * * * *